United States Patent  
Gevlich

(10) Patent No.: US 10,423,716 B2  
(45) Date of Patent: Sep. 24, 2019

(54) CREATING MULTIMEDIA CONTENT FOR ANIMATION DRAWINGS BY SYNCHRONIZING ANIMATION DRAWINGS TO AUDIO AND TEXTUAL DATA

(71) Applicant: Sergey Anatoljevich Gevlich, Khabarovsk (RU)

(72) Inventor: Sergey Anatoljevich Gevlich, Khabarovsk (RU)

(*) Notice: Subject to any disclaimer, the term of this patent is extended or adjusted under 35 U.S.C. 154(b) by 627 days.

(21) Appl. No.: 14/437,424

(22) PCT Filed: Oct. 28, 2013

(86) PCT No.: PCT/RU2013/000960  
§ 371 (c)(1),  
(2) Date: Apr. 21, 2015

(87) PCT Pub. No.: WO2014/070044  
PCT Pub. Date: May 8, 2014

(65) Prior Publication Data  
US 2015/0278181 A1    Oct. 1, 2015

(30) Foreign Application Priority Data

Oct. 30, 2012 (RU) ............................ 2012146006

(51) Int. Cl.  
*G06F 17/24* (2006.01)  
*G06F 3/0484* (2013.01)  
(Continued)

(52) U.S. Cl.  
CPC ........ *G06F 17/241* (2013.01); *G06F 3/04817* (2013.01); *G06F 3/04842* (2013.01); *G06F 17/2229* (2013.01)

(58) Field of Classification Search  
CPC ............ G06F 17/30017; G06F 17/241; G06F 17/30056; G06F 17/24; G06F 17/2247;  
(Continued)

(56) References Cited

U.S. PATENT DOCUMENTS 4,952,051 A * 8/1990 Lovell ................... G06T 13/80  
345/473  
6,100,881 A * 8/2000 Gibbons ................ G06F 17/21  
345/473

(Continued)

OTHER PUBLICATIONS

Adobe Presenter User Guide, Copyright 2006, all pages http://www.adobe.com/resources/acrobatconnect/presenter/pdf/presenter_user_guide.pdf.*

(Continued)

*Primary Examiner* — Mohammed H Zuberi  
*Assistant Examiner* — Carl E Barnes, Jr.  
(74) *Attorney, Agent, or Firm* — Bardmesser Law Group

(57) ABSTRACT

A method and system for creating multimedia prototype presentations use the linear compression or stretching of playback speed record of creating and editing graphic images, which does not lead to degradation of quality perception. When using manually created drafts, schemes and drawings as graphic images of the presentation, the playback of record of their creating and editing process can be sped up or slowed down in a broad time range without losing quality perception of the visual content. The synchronization of the audio and the video track is made by a linear compression or stretching playback speed record of creating and editing the graphic images until the playback duration of the frame visual content and the duration of its sound match.

20 Claims, 7 Drawing Sheets

(51) Int. Cl.
*G06F 3/0481* (2013.01)
*G06F 17/22* (2006.01)

(58) Field of Classification Search
CPC ..... G06F 17/211; G11B 27/031; G06T 13/00; G06T 13/20; G06T 13/60
See application file for complete search history.

(56) References Cited

U.S. PATENT DOCUMENTS

| | | | | |
|---|---|---|---|---|
| 6,404,978 | B1 * | 6/2002 | Abe | G11B 27/034 386/230 |
| 6,469,711 | B2 * | 10/2002 | Foreman | G06F 3/0483 375/E7.026 |
| 6,714,216 | B2 * | 3/2004 | Abe | G11B 27/034 715/716 |
| 7,640,272 | B2 * | 12/2009 | Mahajan | G06F 17/30787 |
| 2003/0078890 | A1 * | 4/2003 | Schmidt | G06F 21/10 705/51 |
| 2004/0001106 | A1 * | 1/2004 | Deutscher | G06F 17/30017 715/838 |
| 2008/0295040 | A1 * | 11/2008 | Crinon | H04N 7/152 715/865 |
| 2011/0007078 | A1 * | 1/2011 | Cao | G06F 3/04845 345/473 |
| 2011/0064388 | A1 * | 3/2011 | Brown | G06T 13/20 386/285 |
| 2011/0154266 | A1 * | 6/2011 | Friend | A63F 13/06 715/863 |
| 2011/0231765 | A1 * | 9/2011 | Sim | H04N 5/783 715/723 |
| 2012/0023407 | A1 * | 1/2012 | Taylor | G06F 9/4443 715/731 |
| 2013/0332859 | A1 * | 12/2013 | Patton | G06F 3/0481 715/753 |

OTHER PUBLICATIONS

Explain Everything Help iOS, all pages https://explaineverything.com/wp-content/explain-everything-resources/help/Explain-Everything-Help_iOS.pdf.*
Explain-Everything-User-Manual, all pages http://explaineverything.com/wp-content/explain-everything-resources/Explain-Everything-User-Manual.pdf.*
CodeProject, Extract Frames from Video Files, Sep. 26, 2007, all pages https://www.codeproject.com/Articles/13237/Extract-Frames-from-Video-Files.*
Adobe Premiere Pro, Feb. 2013.*
Toon Boom Pro 2 Getting Started Guide (Year: 2010).*
Bishmart, Creating Character Voices for Toon Boom Animate, part 3 (Year: 2010); youtube [https://www.youtube.com/watch?v=isX2Q5pxEUg].*

* cited by examiner

US 10,423,716 B2

CREATING MULTIMEDIA CONTENT FOR ANIMATION DRAWINGS BY SYNCHRONIZING ANIMATION DRAWINGS TO AUDIO AND TEXTUAL DATA

CROSS-REFERENCE TO RELATED APPLICATION

This application is a US National Phase of PCT/RU2013/000960 filed on Oct. 28, 2013.

BACKGROUND OF THE INVENTION

Field of the Invention

This invention relates to a method and system for creating multimedia presentation prototypes. The invention also relates to information technology field and is directed to creating audiovisual multimedia presentations consisting of sequences of scenes (frames).

Description of the Related Art

Creating multimedia presentations takes up time and resources. There are methods and devices for creating multimedia presentations described in U.S. Pat. Nos. 8,078,967 and 7,941,757, disclosing definition of scenes (frames) sequence, frame text and visual content and an order of transition between the scenes. These patents also disclose combining and composition of text, visual imagery and audio track into one audio-visual file. U.S. Pat. No. 7,546,544 also discloses creation of multimedia presentations. All of the conventional solutions have the same shortcoming—a high manpower effort and a complexity of use.

Accordingly, a method and system for efficient creation of multimedia presentation prototypes are desired.

SUMMARY OF THE INVENTION

Accordingly, the present invention is related to a system and method for creating multimedia prototype presentations that obviates one or more of the disadvantages of the related art.

A method for creating multimedia prototype presentations uses a linear compression or stretching of playback speed record of creating and editing graphic images does not lead to degradation of quality perception. When using manually created drafts, schemes and drawings as graphic images of the presentation, the playback of record of their creating and editing process can be sped up or slowed down in long timeframes without losing quality perception of the visual content. The synchronization of the audio and the video track is made by a linear compression or stretching playback speed record of creating and editing the graphic images until the playback duration of the frame visual content and the duration of its sound match.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The present invention is directed to a method for creating multimedia presentation prototypes. A user creates a prototype (a light version) of a multimedia presentation for using it for personal or professional purposes. For example, to show a viewer of the presentation a direction to an unknown place, to create a simple garden furniture assembly instruction or to get proposals on developing business process of a company across to work colleagues.

A multimedia presentation includes a video track in a form of graphic images (screens, frames, scenes) sequence and an audio track with a voice dubbing of the presentation text going along with the video sequence. A base for creating an audio track is a text of the presentation prepared in advance, as well as a transcription and editing of unprocessed and unprepared speech.

The text of the presentation and the multimedia-presentation itself consist of elementary indivisible substantial fragments sequence in equivalent to creation technology of the television programs named "frames." Each frame complies with its text (a fragment of the presentation general text), its audio track (a fragment of the presentation general track) and its graphic images in the form of visualization process of creating and editing graphic images.

For the right perception of the presentation content, the displayed on the screen record of a process of creating and editing the frame images must be synchronized with the with text of the current frame. In the exemplary embodiment, a base for multimedia presentation creation is an audio track with the record of the synchronized text of the presentation. A linear compression or stretching of a record playback speed of the voice synchronization leads to essential degradation of quality perception of the synchronized text and the presentation by viewers.

Instead, in the exemplary embodiment, the linear compression or stretching of playback speed record of creating and editing graphic images does not lead to degradation of quality perception. When using manually created drafts, schematics and drawings as graphic images of the presentation, the playback of record of their creating and editing process can be sped up or slowed down in long timeframes without losing quality perception of the visual content. The synchronization of the audio and the video track is made by a linear compression or stretching playback speed record of creating and editing the graphic images until the playback duration of the frame visual content and the duration of its sound match.

Figure 1:
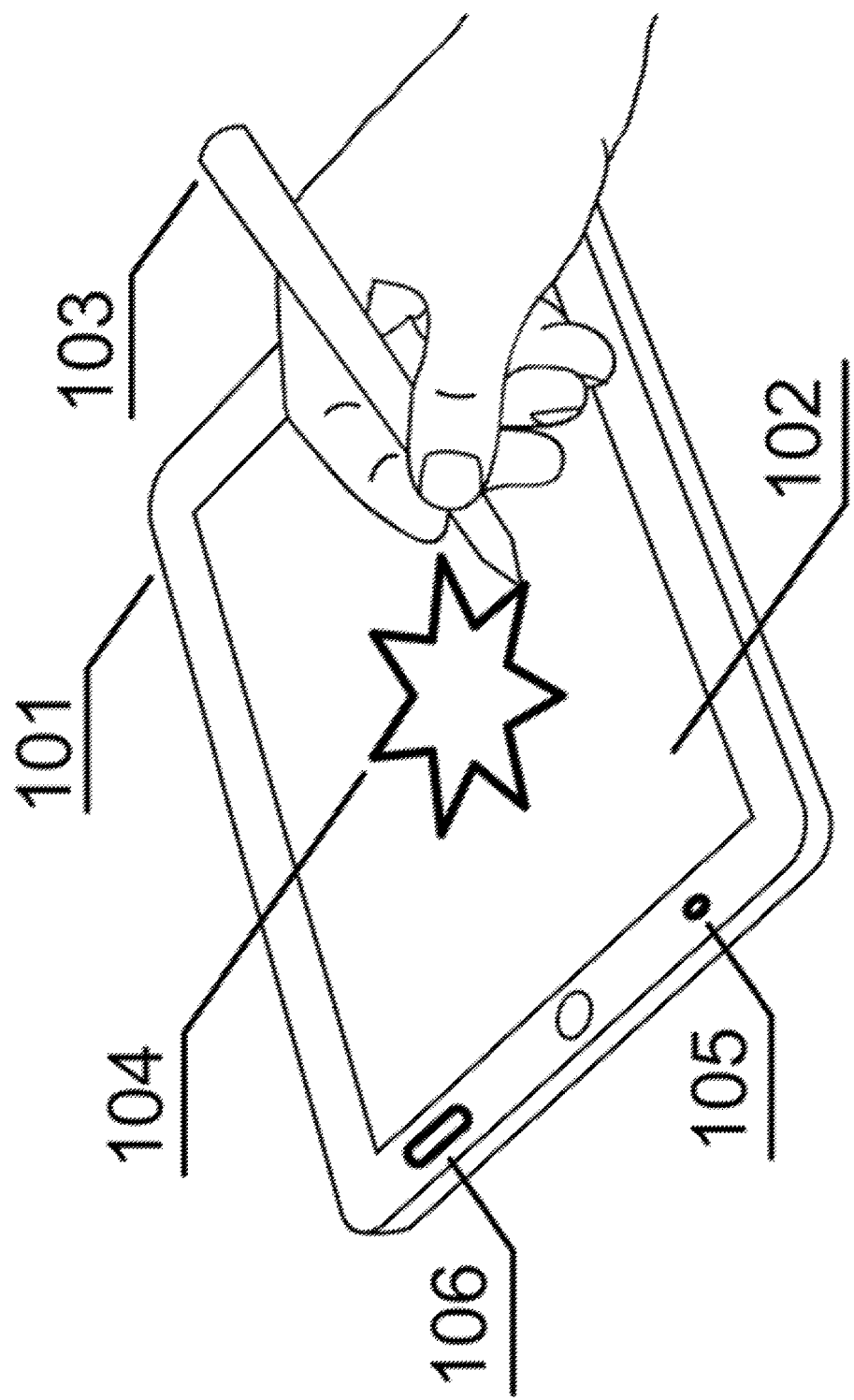
FIG. 1 illustrates implementation of device for creating multimedia-presentations prototypes.

FIG. 1 illustrates implementation of a device for creating multimedia-presentations prototypes where: 101—a device; 102—a screen with a sensor for detecting a position of a finger touch; 103—a stylus for screen interaction; 104—graphic images drawn and displayed on the screen; 105—a device microphone; 106—a device speaker. An exemplary embodiment is designed for use on a portable personal computing devices 101 with a touch screen 102 and geared towards visually displayed and visually controlled process of creating and editing the presentation content. Operations with the touch screen that do not require high accuracy of contact point positioning can be made by fingers. Operations requiring enhanced accuracy of contact point positioning (e.g., drawing) can be made by the stylus 103.

Figure 2:
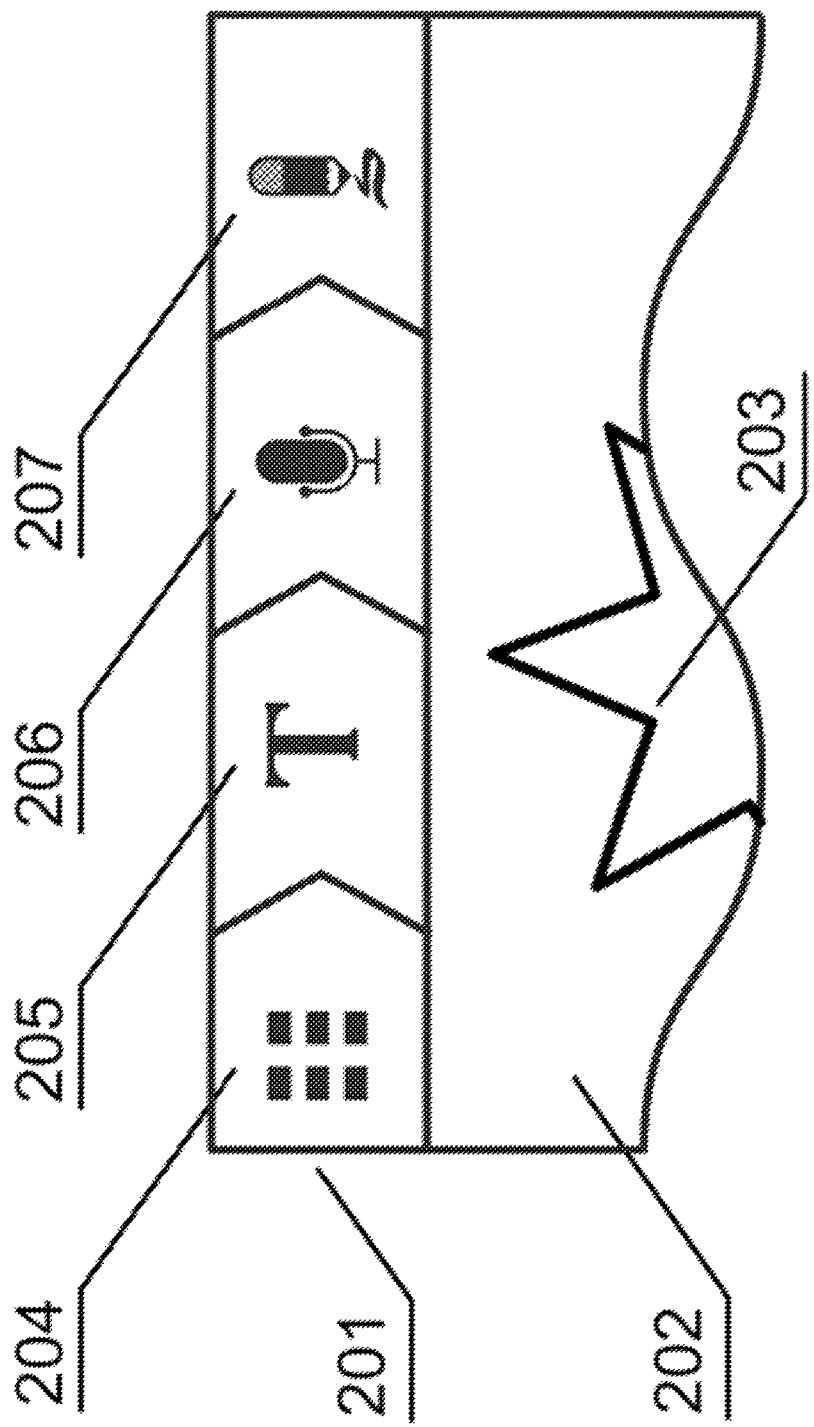
FIG. 2 illustrates a screenshot of the system in different modes.

FIG. 2 illustrates screenshot of the device in different modes, where: 201—device mode of operations selection panel; 202—a work field of the selected mode; 203—a graphical or textual content in a work field; 204—a field-button of mode "Presentations management"; 205—a field-button of mode "Text editing"; 206—a field-button of mode "Sound editing"; 207—a field-button of mode "Graphic editing."

Figure 3:
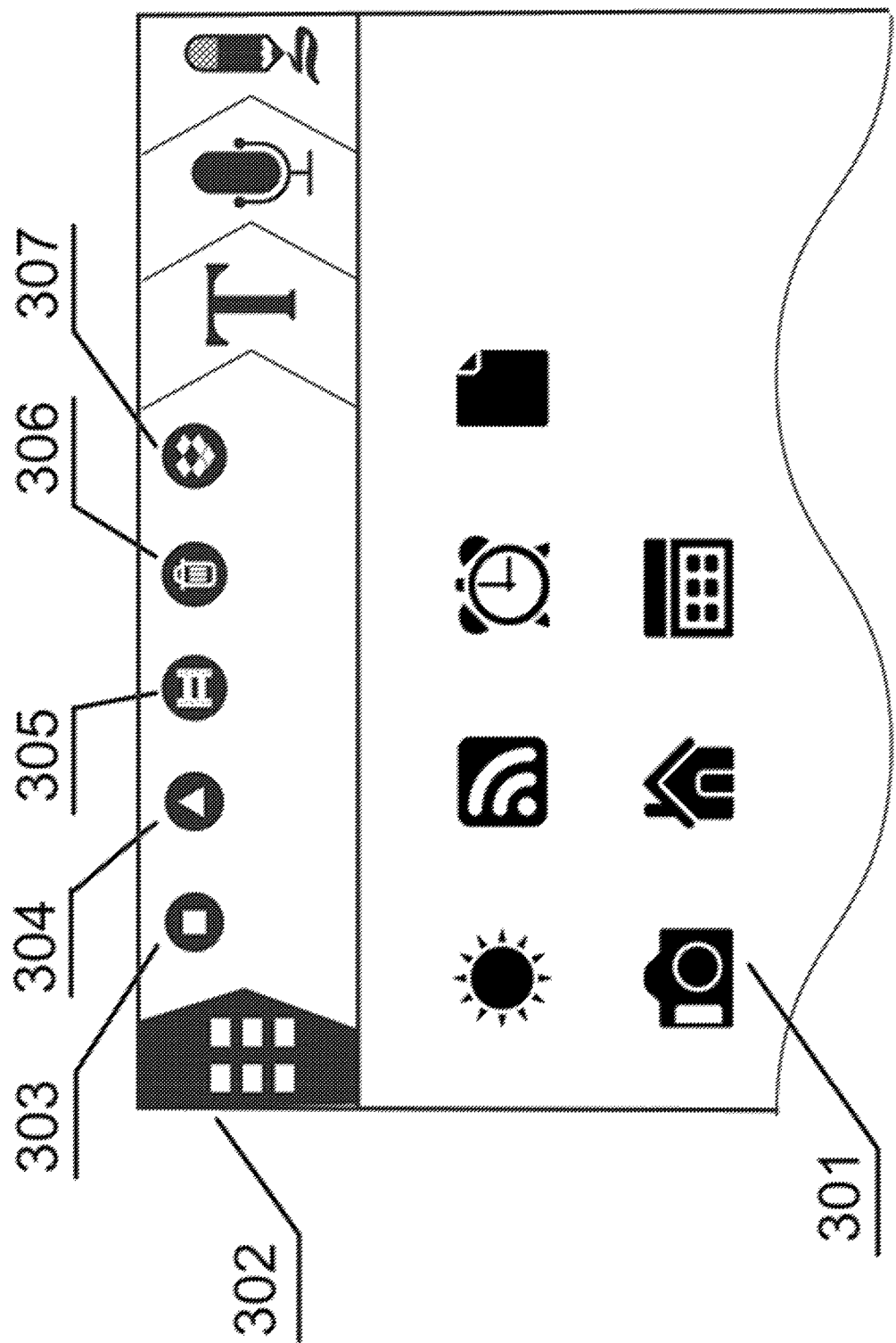
FIG. 3 illustrates a screenshot of the system in a "Presentations management" mode.

FIG. 3 illustrates a screenshot of the device in "Presentations management" mode, where: 301—icons (final drawings) of the presentations prototypes in a work field; 302—minimized button-field of the current mode; 303—button "Create presentation"; 304—button "Open presentation for editing"; 305—button "Launch demonstration of presentation"; 306—button "Delete presentation"; 307—button "Save presentation as".

Figure 4:
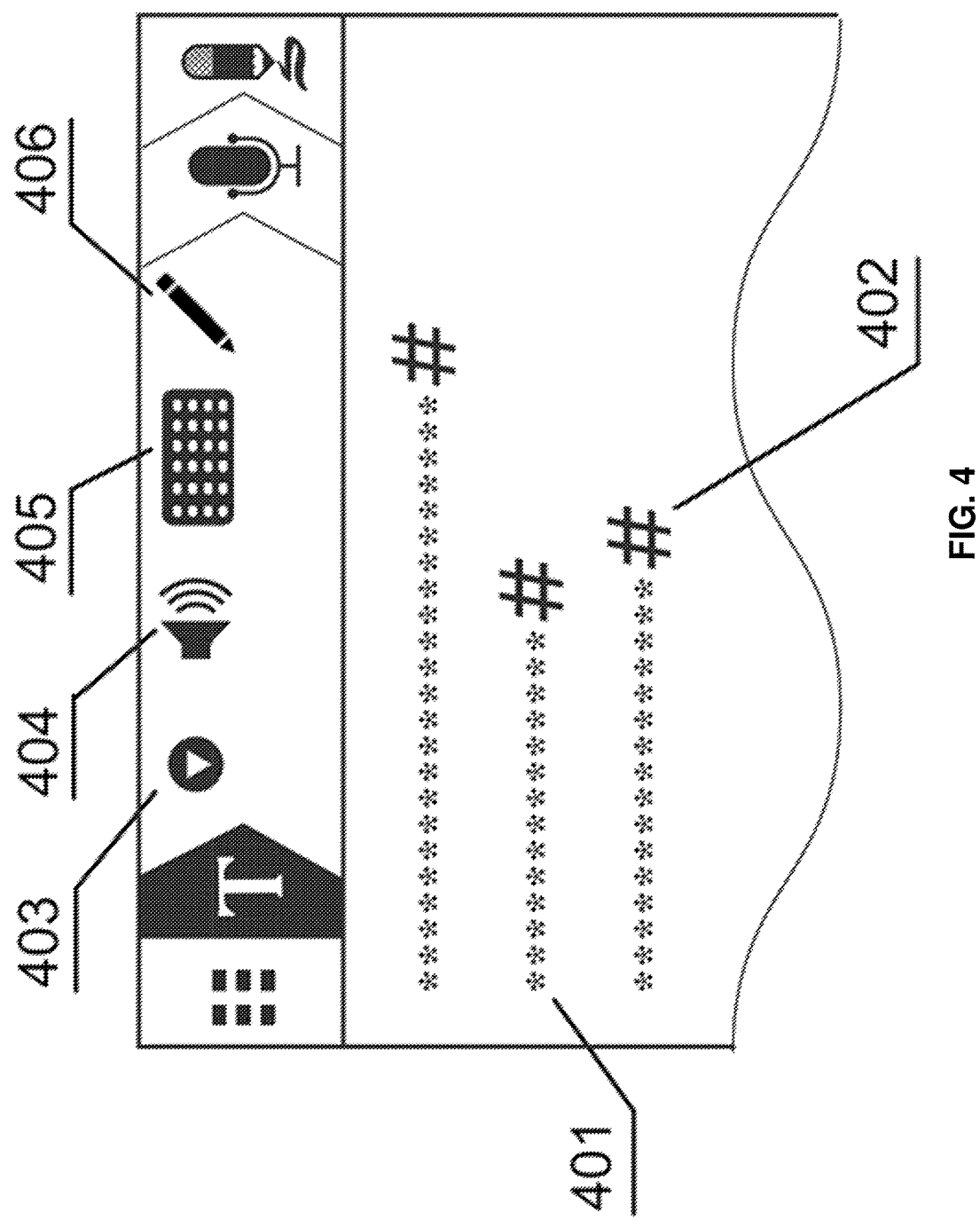
FIG. 4 illustrates a screenshot of the system in a "Text editing" mode.

FIG. 4 illustrates screenshot of the device in "Text editing" mode, where: 401—a text of the prototype in a work field; 402—markers of frames' text edges; 403—a button "Import text"; 404—a button "Verbal dictation of text with recognition"; 405—a button "Enter text from on-screen keyboard"; 406—a button "Insert marker of frames text edges." The markers of the text markup 402 are used for visual splitting of the presentation text and consequently the presentation itself into the frames.

Figure 5:
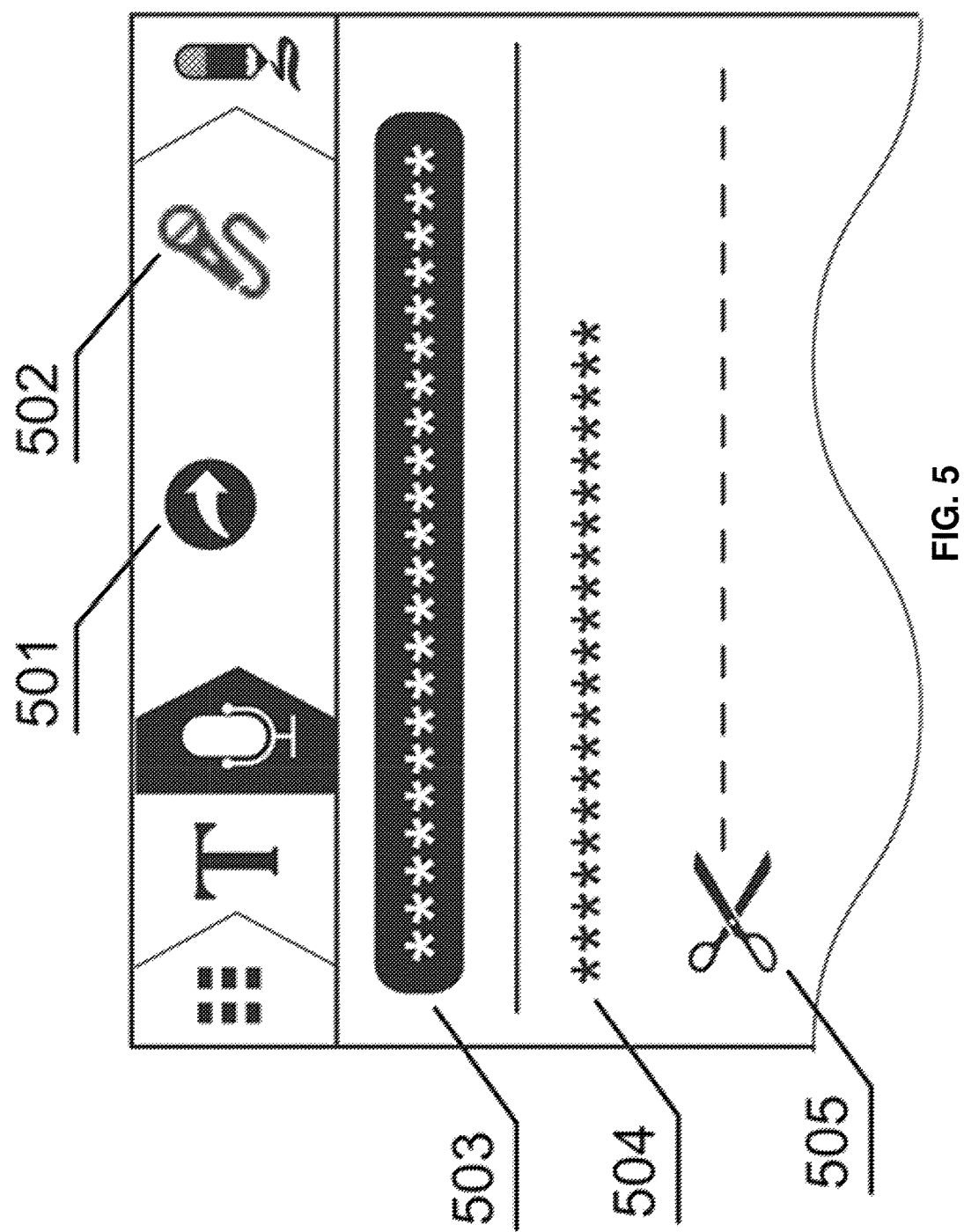
FIG. 5 illustrates a screenshot of the system in a "Sound editing" mode.

FIG. 5 illustrates screenshot of the device in "Sound editing" mode, where: 501—a button "Import sound from file and markup sound into words"; 502—a button "Record sound from microphone and markup sound into words"; 503—a text of a part of the presentation for which an audio track is already marked up into the frames; 504—a text of a part of the presentation for which an audio track is not marked up into the frames yet; 505—process visualization and animation and marked up edges of an audio track.

Figure 6:
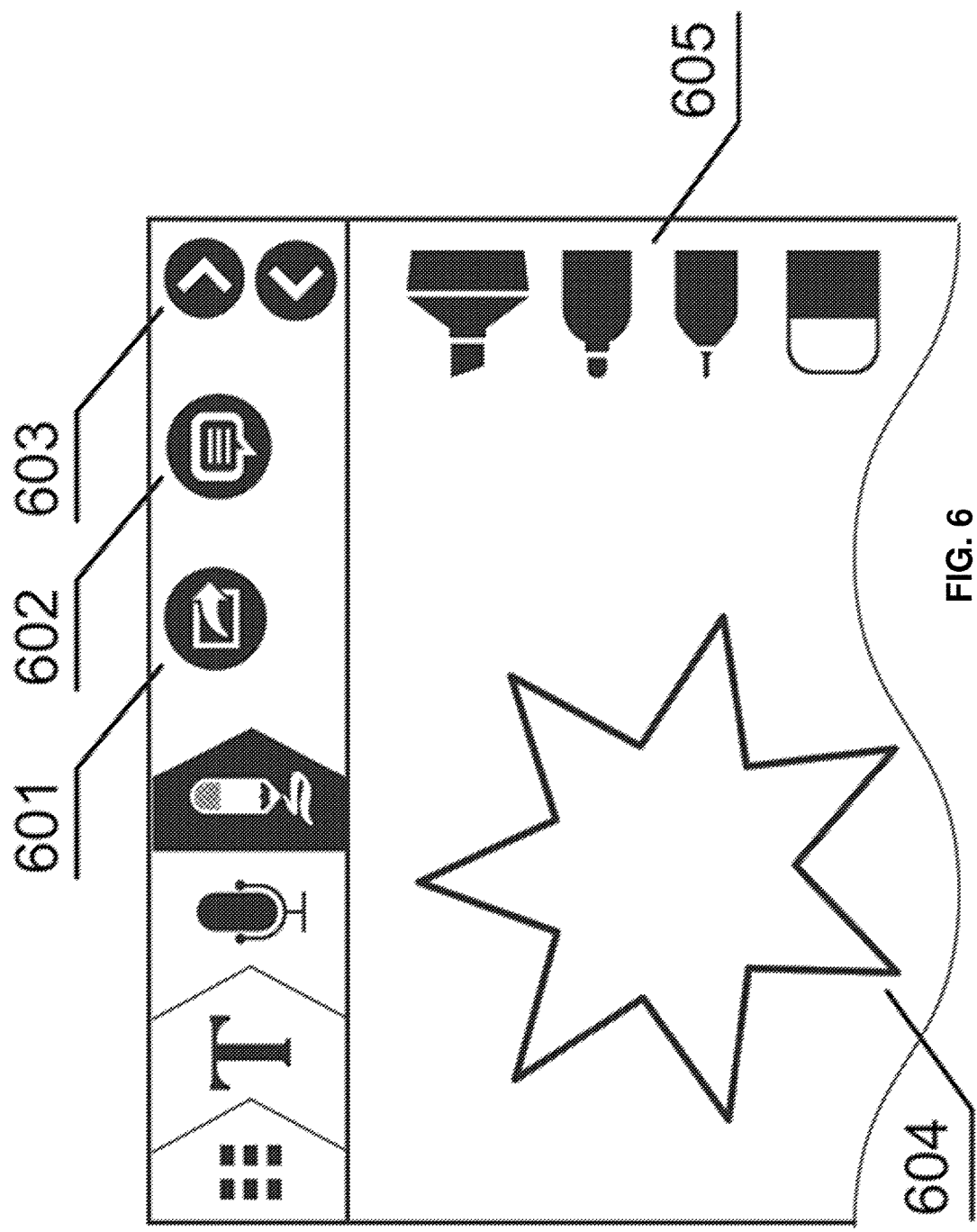
FIG. 6 illustrates a screenshot of the system in a "Graphic editing" mode.

FIG. 6 illustrates a screenshot of a system in "Graphic editing" mode, where: 601—a button "Turn on/off figures automatic recognition mode"; 602—a button "Turn on/off text narrator"; 603—a button "Move forward/back through frames"; 604—graphic images being created; 605—graphic tools and palette.

According to an exemplary embodiment, the multimedia prototypes are created according to the following scenarios.
"Text/Text_markup_into_frames/Sound/Sound_markup_into_frames/Graphics";
"Text/Text_markup_into_frames/Graphics/Sound/Sound_ markup_into_frames";
"Sound/Text/Text_markup_into_frames/Sound_markup_into_frames/Graphics".

The method of creating multimedia presentations prototypes using the scenario "Text/Text_markup_into_frames/Sound/Sound_markup_into_frames/Graphics" includes determination of order of frames, their textual and visual content and the order of transition between the frames, preparation and mutual composition of text, visual content and audio track of multimedia presentation into an audio-video file by using a personal computing device (e.g., Smartphone, tablet, laptop, PC, etc.). The preparation and mutual arrangement of text, visual content and audio track is implemented as follows:

1) Prepare a single coherent presentation text and enter it into the device 101;

2) Split the presentation text into fragments corresponding to the presentation frames, place the marker of the text markup into frames between all neighboring frames 402;

3) Record (load) an audio track with a verbal voice content of the presentation;

4) Split the audio track with verbal voice content of the presentation into frames;

5) Create visual imagery of frames for each frame of the presentation by:
    creating and editing graphical content of the frame;
    recording a visual representation of all actions of creating and editing visual content.

6) Arrange the presentation prototype by:
  a) Preparing its own configuration file for each frame and:
    determining the play time of the frame within the audio track;
    making uniform time scaling (shrink/expand) of visual representation for creating and editing graphic content of the frame visual imagery until the duration of the frame visual representation and the duration of its audio content match;
    determining data of frame visualization (aspect ratio, resolution, color, transparency, FPS, etc.);
    playing back the frame audio track and the time scaled visual representation of the frame content simultaneously and recording the resulting mix of sound and animation into a configuration file of the frame;
    playing back the configuration file of the frame on a screen and evaluating it. If the result is positive—saving the file, if the result is negative—editing text, sound, frame figures and the repeating configuration of that frame.
  b) Combine the configuration files of the frames with the required order of the frames sequence into a single audio-visual file of the presentation;

7) Review the configuration audio-visual file of the presentation for the evaluation of its level of completeness and correspondence to the purposes of the presentation.

According to the evaluation results:
  a) Make the required correction of text, sound or visual content of the frames in a particular work session and repeatedly configure the presentation prototype;
  b) Save the configuration file of the presentation in a format allowing for future editing of text, sound and visual imagery of frames in the next work session;
  c) Convert the configuration file of the presentation into a video-file without possibility of future editing of text, sound or images of the frames.

The method of creating prototypes of multimedia presentations in a scenario "Text/Text_markup_into_frames/Graphics/Sound/Sound_markup_into_frames" includes determination of frames order, textual and visual content and the order of transition between frames, preparation and mutual composition of text, visual content and audio track of multimedia presentation into an audio-video file by using personal computing device (e.g., Smartphone, tablet, laptop, PC). The preparation and mutual arrangement of text, visual content and audio track is implemented as follows:

1) Prepare a single coherent presentation text and enter it into the device 101;

2) Split the presentation text into fragments corresponding to the presentation frames, place a marker of the text markup into frames between all the neighboring frames 402;

3) Create visual content of the frames for each frame of the presentation by:
   creating and editing graphic content of the frame;
   recording visual representation of all actions of creating and editing graphic content.

4) Record (load) an audio track with verbal voice content of the presentation;

5) Split the audio track with verbal voice content of the presentation into frames;

6) Arrange the presentation prototype, and:
   a) Prepare its own configuration file for each frame by:
   determining the time of a frame sound playback within the audio track;
   making a uniform time scaling (shrink/expand) of visual representation of the graphic content of the frame imagery until the duration of the frame visual representation and the duration of its sound match;
   determining data of frame visualization (i.e., aspect ratio, resolution, color, transparency, FPS, etc.);
   playing back the frame audio track and the time scaled visual representation for creating and editing graphic contents of the frame and recording the resulting mix of sound and animation into a configuration file of the frame;
   playing back the configuration file of the frame on a screen and evaluating it. If the result is positive—saving the file, if the result is negative—going back to editing text, sound, frame graphics and the repeated configuration of that frame;
   b) Combine the configuration files of the frames with the required order of the frames sequence into a single audio-visual file of the presentation.

7) Review the arrangement audio-visual file of the presentation for the evaluation of its level of completeness and correspondence to the purposes of the presentation. According to the evaluation results:
   a) Make the required correction of text, sound or visual content of the frames in a particular work session and repeatedly configure the presentation prototype;
   b) Save the configured file of the presentation in a format allowing for future editing of text, sound and visual imagery of the frames in the next work session;
   c) Convert the configuration file of the presentation into a video-file without possibility of future editing text, sound or images of the frames.

The method of creating prototypes of multimedia presentation in a scenario "Sound/Text/Text_markup_into_frames/ Sound_markup_into_frames/Graphics" includes determination of frames' order, their textual and visual content and the order of transition between frames, preparation and mutual composition of text, visual content and audio track of multimedia presentation into an audio-video file, by using personal computing device (e.g., Smartphone, tablet, laptop, PC). Preparation and mutual arrangement of text, visual content and audio track is implemented as follows:

1) Record (load) an audio track with a verbal voice content of the presentation;

2) Prepare a single coherent presentation text and enter it into the device;

3) Split the presentation text into fragments corresponding to the presentation frames, placing the marker of the text markup into frames between all the neighboring frames;

4) Split the audio track with a verbal voice content of the presentation into frames;

5) Create visual imagery of the frames for each frame of the presentation by:
   creating and editing graphic content of the frame;
   recording visual representation of all actions of creating and editing graphic content.

6) Configure the presentation prototype and:
   a) Prepare its own configuration file for each frame by:
   determining the time of a frame playback within the audio track;
   making uniform the time scaling (shrink/expand) of visual representation of creating and editing graphic figures of the frame visual imagery until the duration of the frame visual representation and the duration of its sound matches;
   determining data of frame visualization (aspect ratio, resolution, color, transparency, FPS, etc.);
   simultaneously playing back the frame audio track and the time scaled visual representation for creating and editing graphic content of the frame and recording the resulting mix of sound and animation into a configuration file of the frame;
   playing back the configuration file of the frame on a screen and evaluating it. If the result is positive—save the file, if the result is negative—going back to editing text, sound, frame figures and the repeated configuration of the frame;
   b) Combine the configuration files of the frames with the required order of the frames sequence into a single configuration audio-visual file of the presentation.

7) Review the configuration audio-visual file of the presentation for the evaluation of its level of completeness and correspondence to the purposes of the presentation. According to the results of the evaluation:
   a) Make the required correction of text, sound or visual imagery of the frames in a particular work session and repeatedly configure the presentation prototype;
   b) Save the configuration file of the presentation in a format allowing for future editing of text, sound and visual imagery of the frames in the next work session;
   c) Convert the configuration file of the presentation into a video-file without possibility of future editing text, sound or images of the frames.

Additionally, in all three of above mentioned scenarios ("Text/Text_markup_into_frames/Sound/Sound_markup_into_frames/Graphics", "Text/Text_markup_into_frames/Graphics/Sound/ Sound_ markup_into_frames" and "Sound/Text/Text_markup_into_frames/Sound_markup_into_frames/Graphics") the audio track of the audio voice content of the presentation is split into frames as follows:

1) To display:
   a) Content of frames' text and audio (synchronized at that particular moment) visually presented as segments (bars) corresponding to the frames of the presentation, so visual representation of text, bars or edges of for the frames, for which the audio track has already been marked up into fragments (frames), is visually different from presentation of text, bars or edges of bars for the frames, for which the audio track has not been marked up yet;

b) Mutual visual border of text content of the presentation corresponding to splitting frames into the frames with marked up and not marked up audio so that visual location of the border on the screen stays constant as a result of moving (i.e., scrolling) of the frame bars during the mark up process.

2) To listen to an audio when synchronization of one frame ends and synchronization of another frame begins:

a) In case of a manual markup, to insert a marker of an audio track markup, for example, by pressing on image of text bar of the next frame and visually animating a set up of the markup, e.g., by changing the look of the bar edge;

b) In case of an automatic speech recognition (the automatic matching recognizes words to texts of the frames and automatically marks up the audio track), to check the accuracy of an automatic audio markup and, if necessary, to correct the markup.

Additionally, in all three of the above mentioned scenarios ("Text/Text_markup_into_frames/Sound/Sound_markup_into_frames/Graphics", "Text/Text_markup_into_frames/Graphics/Sound/Sound_ markup_into_frames" and "Sound/Text/Text_markup_into_frames/Sound_markup_into_frames/Graphics") when creating and editing graphic content of a frame, the following operations or their combinations are performed:

- load graphic objects and images from an external source;
- record video/take a picture by a camera integrated into the user device and insert pictures and videos into visual content of the frames;
- automatically detect drawn figures and/or lines and correct their geometry and, if the suggested version is approved, delete the originally created figures and/or lines, replace them with the edited figures and/or lines, and the duration of creating and editing graphic figures is equal to the duration of creating and editing originally created graphic figures and/or lines, excluding the actual time for automatic correction and review of suggested versions;
- attach indicating (connective) lines and captions to figures and automatically move matching lines and text along with figures when moving them during the course of editing;
- set a method of transition between visual imageries of two adjacent frames;
- playback a fragment of an audio track of a current frame in order to check creation of visual imagery of the frame, drawing and editing graphic figures;
- perform a test animation of an already created part of visual imagery of a frame in order to check creation of visual imagery of a frame;
- make integration (merging) of several graphic figures and/or their elements into complex objects with the possibility of following managing of these objects (moving, rotating, skewing, rescaling, showing/hiding, etc.) as integrated images.

Additionally, in all three of the above mentioned scenarios ("Text/Text_markup_into_frames/Sound/Sound_markup_into_frames/Graphics", "Text/Text_markup_into_frames/Graphics/Sound/Sound_ markup_into_frames" and "Sound/Text/Text_markup_into_frames/Sound_markup_into_frames/Graphics") when creating configuration file of a frame for synchronization of animation with audio, the time of visual representation of creating and editing graphic content of the frame visual imagery is determined by one of the following ways:

a) From the start marker of the frame audio record within the audio track to the end marker of the frame audio (including time of pauses before the first word and after the last one);

b) From the start of the actual sound of the first word of the frame text to the end of the sound of the last word of the frame text (excluding time of the pauses before the first word and after the last one);

Thus, in both cases a) and b) the additional delays (pauses) can be inserted before the start of the sound of the first word of the first frame and after the end of the sound of the last word of the last frame.

Additionally, in all of the three above mentioned scenarios ("Text/Text_markup_into_frames/Sound/Sound_markup_into_frames/Graphics", "Text/Text_markup_into_frames/Graphics/Sound/Sound_ markup_into_frames" and "Sound/Text/Text_markup_into_frames/Sound_markup_into_frames/Graphics") the correction of text, sound and visual imagery of frames is made as follows:

1) If there is a visual imagery in the original frame when splitting the original frame into two new frames:
- to split the text of the frame by the text markup marker into two fragments corresponding to two new frames;
- to choose which one of the two new created frames will have the visual imagery of the original frame;
- to create visual imagery for the second frame created.

2) When integrating two adjacent original frames into one new frame:

a) If there is no visual content in the frames—delete markers of the text markup and the audio track of the frames;

b) If there is imagery content only in one of the integrated frames—delete the marker of text markup and the audio track of frames and attach the visual imagery to the resulting integrated frame;

c) If there are visual imageries in both integrated frames:
- delete the markers of text markup and the audio track of frames;
- create the resulting audio track by connecting of two consecutive original audio tracks keeping their original sequence;
- create the resulting visual imagery by consecutive connection of two original visual imageries keeping their original sequence and a frame rate of the original frames.

Additionally, in all three of the above mentioned scenarios ("Text/Text_markup_into_frames/Sound/Sound_markup_into_frames/Graphics", "Text/Text_markup_into_frames/Graphics/Sound/Sound_ markup_into_frames" and "Sound/Text/Text_markup_into_frames/Sound_markup_into_frames/Graphics") the markup of the audio track of the presentation into frames can be corrected as follows:

- determine two adjacent frames and location of the marker of the audio track markup to be corrected;
- display an image of audio track with a sound end marker;
- playback continuous consistent sounds of both frames and simultaneously display a time line with the locator of the current position of marker of the audio track markup;
- move the locator of the marker of audio track markup on a time line right or left after listening to the end of one frame and the beginning of the following one;
- check the result after moving to a playback audio track from a time mark N seconds to a new position of the marker of the audio track markup where N is from 0 to 4 seconds.

Additionally, in all three of the above mentioned scenarios ("Text/Text_markup_into_frames/Sound/Sound_markup_into_frames/Graphics", "Text/Text_markup_into_frames/Graphics/Sound/Sound_ markup_into_frames" and "Sound/Text/Text_markup_into_frames/Sound_markup_into_frames/Graphics") a transition between visual imageries of two adjacent frames when opening (creating) a new frame is implemented in the following ways or a combination there of:

save the image of the previous frame without changes as a start image of a new frame;
erase the image of the previous frame completely;
erase the entire image of the previous frame by moving an eraser tool on a screen;
erase the image of the previous frame up to background (i.e., a background image);
erase a part of screen field by the eraser tool (horizontally);
erase chosen elements of the image of the previous frame (choose by elements);
restore a final image of the frame before the previous one (cancel all changes of the image made on the previous frame);
move (rotate) a visual field (virtual image sheet) of the previous frame, open a clean space for creating graphics of a new frame and leave in sight a small portion of the image of the previous frame;
minimize into an icon the resulting image of the previous frame placing the icon on the screen field of a new frame (as a reminder of the previous frame);
minimize the resulting image of the previous frame and leave it on the screen field of a new frame (for drawing a new image around the previous one);
extend the resulting image of the previous frame (a part of the image is possibly out of the frame) and leave the part apparent within the frame edges on the screen field of a new frame (for drawing a new image inside the part of the previous one).

According to the exemplary embodiment, devices for creating multimedia presentations prototypes can be designed in versions "Mini" and "Screen." A device 101 for creating multimedia presentations prototypes in the "Mini" version is designed in the form of a portable personal computing device (e.g., Smartphone, tablet, laptop), containing a touch screen display 102 provided with a sensor detecting the position of a finger touch, on-screen or physical keyboard, built-in or external microphone 105, built-in or external speaker 106, a data processing unit connected to the display, to the keyboard, to the microphone and to the speaker and designed with an option to receive, process and output signals and data.

Additionally, the device is designed with the following options:

when user touches the displayed text on the screen, process positions of a finger touch as a command of the location of the displayed text edges splitting into text fragments 402 and form data structures in the device memory corresponding to the specified fragments (frames);
split the recorded audio track into audio slices and connect them with the text fragments (frames);
record a process of drawing by user's finger touch on the display and connect them with the text fragments (frames);
scale (shrink/expand) proportionally on the display playback time of drawing process by user's finger touch;
display on screen the recorded process of figures drawing corresponding to the matching text fragments (frames) on a time scale equal to the sound duration of the audio slices corresponding to these text fragments (frames) with simultaneous playback of these audio fragments.

Additionally, a data processing unit is designed with the option to perform the following operations or a combination thereof:

automatically detect verbal text pronunciation;
automatically divide the recorded audio track into audio slices and connect these audio slices with the matching text fragments (frames);
automatically detect drawn graphic figures and chose their smoothed out and/or regular-shaped equivalents from the image library.

A device for creating multimedia presentations prototypes in "Screen" version is designed in the form of portable personal computing device (e.g., Smartphone, tablet, laptop) containing:

a touch screen display provided with a sensor detecting the position of finger touch designed with an option of displaying on the screen the device mode of operations selection panel, so that when different zones of the panel the device are touched, the device switches to corresponding modes of operation;
a device on-screen mode of operations selection panel designed in the form of a bar visually divided into the field-buttons with symbolic representations of device operation modes (icons), so when these field-buttons are pressed, they expand lengthwise (unfold) and the sub-buttons available in these modes of operations of the device appear;
an on-screen or physical keyboard;
a built-in or external microphone;
a built-in or external speaker;
a data processing unit connected to the display, to the keyboard, to the microphone and to the speaker and designed with option to receive, process and output signals and data.

Additionally, a device mode of operations selection panel 201 is located in the upper section of the screen across the entire width and is provided with the fields-buttons "Presentation management" 204, "Text editing" 205, "Sound editing" 206, "Graphic editing" 207. A work field of active operation mode 202 is displayed under the selection panel on the device screen. Thus, at launching (startup) of the device, if the processed multimedia presentation prototype is not chosen, the device switches to the "Presentation management" mode and the icons (final drawings) available for review or editing of the presentations prototypes with captions 301 are displayed in a work field. If the prototype is chosen at launch, the device switches to the "Text editing" mode of the chosen prototype and the text of prototype 401 is displayed in a work field.

Additionally, the field-button "Presentation management" 204 after it is opened (pressed) contains the sub-buttons "Create presentation" 303, "Open presentation for editing" 304, "Launch demonstration of presentation" 305, "Delete presentation" 306 "Save presentation as" 307. Thus, the icons (final drawings) of presentation prototypes with captions 301 are displayed in a work field.

Additionally, the field-button "Text editing" after it is opened (pressed) contains the sub-buttons "Text import" 403, "Text verbal dictation with recognition" 404, "Text input from on-screen keyboard" 405, "Insert the marker of the frame text edge" 406. Thus, the text of the prototype 401 is displayed in a work field.

Additionally, the field-button "Sound editing" after it is opened (pressed) contains the sub-buttons "Import sound from file and markup sound into words" 501 and "Record sound from microphone and markup sound into words" 502. Thus, the text of the prototype is visually split into segments (bars) corresponding to fragments (frames) 503 of the presentation and is displayed in a work field, so that the text part of the presentation, for which an audio track is already marked up into fragments (frames), visually differentiates from the part for which markup is not done yet 504.

Additionally, field-button "Graphic editing" after it is opened (pressed) contains the sub-buttons "Turn on/turn off figures automatic recognition mode" 601, "Turn on/turn off text narrator" 602, "Move forward/back through frames" 603. Thus, the image sheet (canvas), tools and palette 605 for creating and editing graphic images of the current fragment (frame) 604 is displayed in a work field.

Additionally, if at the opening (pressing) of the "Sound editing" button there are graphic images of the presentation fragments (frames), the icons of graphic images corresponding to these fragments (frames) are displayed in segments (bars) of a work field along with the text. Additionally, the segments (bars) of the work field are designed with an option of being pressing by a finger so upon being pressed, the pronounceable or recognizable text is attached to the fragment (frame) of the text displayed in a current segment (bar) of the work field.

Additionally, the text displayed in the segments (bars) of the work field is designed with an option of tactile selection and moving the text from a segment (bar) of one fragment (frame) to another. Additionally, the sub-button "Move forward/back through frames" for the frame starting from the second is designed in the form of two buttons "Scroll forward/back" and "Select the look of transition between frames" so when pressed by finger, the button "Select the look of transition between frames" a list of selections of the transition mode is displayed, which is designed as a set of the following buttons:

"Save frame image as starting image of the next frame," "Erase frame image entirely and instantly," "Erase frame image entirely with delay," "Erase frame image entirely with eraser tool," "Erase frame image up to background," "Erase part of frame image with eraser tool," "Erase selected elements of frame image," "Restore final image of the frame before the previous," "Move (rotate) the image opening blank space to create figures of a new frame and leaving in sight a small part of the previous frame image," "Minimize frame image placing the icon on the field of a new frame," "Shrink frame image and leave it on the field of a new frame," "Expand frame image and leave it on the field of a new frame."

Methods of using the device for creation of multimedia presentations prototypes can be implemented in the scenarios:

"Text/Text_markup_into_frames/Sound/Sound_markup_into_frames/Graphics",

"Text/Text_markup_into_frames/Graphics/Sound/Sound_ markup_into_frames" and

"Sound/Text/Text_markup_into_frames/Sound_markup_into_frames/Graphics".

A method of using the device 101 for creation of multimedia presentations prototypes uses a personal computing device with a keyboard, a microphone 105, a speaker 106 and a touch screen 102. Control and selection of devices operation modes buttons 201 and a work field of data processing 202 are displayed on the screens of the devices. Methods of using the device includes entering text, sound and graphic symbols, their processing and composition into an audiovisual file of the multimedia presentation.

Method of using the device for creation of multimedia presentations prototypes in a scenario "Text/Text_markup_into_frames/Sound/Sound_markup_into_frames/Graphics" is implemented as follows:

1) After launching, switch the device to the presentation management mode;

2) Press Create presentation button 303 and switch the device to creation of a presentation mode;

3) Name the presentation in creation of presentation mode, press text editing button and switch the device to creation of a text part of the presentation mode;

4) At creation of the text part of presentation mode, press the button corresponding to the way of the presentation of a text input in the device, as follows:

a) At importing text from external file—import a text button 403;

b) At text input from on-screen keyboard—show an on-screen keyboard button 405;

c) At verbal text input with automatic recognition—verbal dictation with recognition button 404;

5) Enter text into the device, thus the entered text is placed in a work field 202 of the device screen;

6) Insert markers of fragment (frame) 402 text edge, and in order to press the button, set the marker of a frame text edge button 406 and after that press:

a) At importing text from an external file or upon entering a text from the on-screen keyboard—the text displayed in a work field inside the markers of the frames' text edges;

b) At verbal text entering with automatic words recognition and placing markers of words edges—place markers of words edges inside the markers of the frames' text edges;

7) Press sound editing button 206 and switch the device to a sound editing mode of the presentation;

8) At sound editing mode, select a source of the sound so that depending on the source the following buttons are pressed:

a) At importing sound from an external file—sound is imported by the external file button 501, by the external file location button and by the launch/stop audio playback button;

b) At recording sound from microphone—record sound by microphone button 502 and by launch/stop audio playback button.

9) At audio playback launch to display on the screen:

a) Text of sound frames (synchronized) at that particular moment visually presented as segments (bars) corresponding to the frames of the presentation, so visual representation of the text, bars or edges of the frames for which the audio track has already been marked up into fragments (frames) 503 is visually different from presentation of the text, bars or edges of the frames for which the audio track has not been marked up yet 504;

b) Mutual visual border of the text content of the presentation corresponds to the splitting frames with marked up and not marked up sounds 505 so that a visual location of the border on the screen stays constant as a result of move (scrolling) of the frame bars during the process of marking up.

10) At audio playback, listen to the sound and when synchronization of one frame ends and synchronization of another frame begins:

a) At manual markup—press on an image of a text bar of the next frame and insert the displayed marker of an audio track markup, thus, additionally visually animate setup of the markup, e.g., by changing a look of the bar edge;

b) At an automatic speech recognition—automatically match recognized words to the texts of the frames and automatically markup the audio track—to check the accuracy of the automatic sound markup. If an error of recognition and markup is detected, press launch/stop audio playback button and correct the markup.

11) Press graphic editing button 207 and switch the device to Graphic editing of the presentation frames mode, thus, image sheet (canvas), tools and palette 605 for creating and editing graphic images of the frame 604 is displayed in a work field starting from the first one.

12) In graphic editing mode, press buttons corresponding to selected tools of graphics palette and create and edit graphic figures of the frame by touching the device screen in the area of sheet (canvas), thus, record a visual representation of all actions for creating and editing figures.

13) In graphic editing mode the following buttons can be pressed:
   a) Turn on/turn off figures automatic recognition mode 601;
   b) Turn on/turn off text and/or audio narrator 602;
   c) Move forward/back through frames 603;
   d) Select the look of transition between frames.

14) Press demonstration of the presentation button 305 and switch the device to configuration and demonstration of the presentation mode, thus:
   a) Determine time of frame playback at audio track for each frame;
   b) Make uniform time scaling (shrink/expand) of visual representation of creating and editing graphic figures of visual imagery of each frame until the duration of the frame visual representation and the duration of its sound match;
   c) Determine data of frame visualization (aspect ratio, resolution, color, transparency, FPS, etc.);
   d) Launch via a speaker 106, a playback of an audio track of the presentation and on the screen the time scaled visual representation of creating and editing graphic figures of the frames in their sequence and record the resulting mix of the sound and the animation into a configured audiovisual file of the presentation.

15) Review demonstration of the presentation and evaluate its level of completeness and correspondence to the purposes of the presentation. According to the results of the evaluation:
   a) Press the buttons of text, sound or graphic editing and move over to text, sound or graphic correction in this particular work session and to repeat configuration of the presentation;
   b) Press "Save work" version of file button 307 and save the configuration file of the presentation in format allowing for future editing of text, sound and visual imagery of the frames in the next work session;
   c) Press "Save as" video file button and convert the configuration file of the presentation into a video file without possibility of future editing of text, sound or images of the frames.

Method of using the device for creation of multimedia presentations prototypes in a scenario "Text/Text_markup_into_frames/Graphics/Sound/Sound_markup_into_frames" is implemented as follows:

1) After launching, switch the device to the presentation management mode;

2) Press Create presentation button and switch the device to creation of the presentation mode;

3) Name the presentation in creation of presentation mode, press the text editing button and switch the device to creation of a text part of the presentation mode;

4) At creation of text part of the presentation mode, press the button corresponding to the way of the presentation text input in the device, as follows:
   a) At importing text from an external file—import text button 403;
   b) At text input from an on-screen keyboard—show an on-screen keyboard button 405;
   c) At verbal text input with automatic recognition—verbal dictation with recognition button 404;

5) Enter text into the device, so that the entered text is placed in a work field of the device screen;

6) Insert markers of the fragment (frame) text edge, in order to press the button, set the marker of the frame text edge button 406 and after that press:
   a) At importing the text from external file or entering the text from an on-screen keyboard—the text is displayed in a work field inside the markers of the frames' text edges;
   b) At verbal text entering with automatic words recognition and placing markers of words edges—place markers of the words edges inside the markers of the frames' text edges.

7) Press a graphic editing button 207 and switch the device to Graphic editing of the presentation frames mode. Thus, image sheet (canvas), tools and palette for creating and editing graphic images is displayed in a work field starting from the first one.

8) In graphic editing mode, press buttons corresponding to selected tools of graphics palette and create and edit graphic figures of the frame 604 by touching the device screen in the area of sheet (canvas). Thus, record a visual representation of all actions for creating and editing figures.

9) In graphic editing mode the following buttons can be pressed:
   a) Turn on/off figures automatic recognition mode 601;
   b) Turn on/off text and/or audio narrator 602;
   c) Move forward/back through the frames 603;
   d) Select the look of the transition between the frames;

10) Press sound editing button 206 and switch the device to a sound editing mode of the presentation;

11) In sound editing mode, select a source of the sound and depending on the source press the following buttons:
   a) At importing a sound from external file—sound import by an external file button 501, by an external file location button and by launch/stop an audio playback button;
   b) At recording a sound from a microphone—record the sound from the microphone button 502 and launch/stop audio playback button;

12) At the audio playback, launch to display on screen:
   a) Text of sound frames (synchronized) at that particular moment visually presented as segments (bars) corresponding to the frames of the presentation, so visual representation of text, bars or edges of for the frames for which the audio track has already been marked up into fragments (frames) 503 is visually different from presentation of text, bars or edges of bars for the frames for which the audio track has not been marked up yet;
   b) Mutual visual border of the text content of the presentation 505 corresponding to splitting sound frames marked up and not marked up so that a visual location of the border on screen stays constant as a result of move (scrolling) of the frame bars in the process of marking up.

13) At audio playback, listen to the sound, and when a synchronization of one frame ends a synchronization of another frame begins:
   a) At manual markup—press on image of a text bar of the next frame and insert the displayed marker of the audio track markup. Thus, additionally visually animate a setup of the markup, e.g., by changing the look of a bar edge;

b) At automatic speech recognition, automatically match recognized words to the texts of the frames and automatically markup the audio track—to check accuracy of an automatic sound markup, and if an error of recognition and markup is detected, press launch/stop audio playback button and correct the markup;

14) Press a demonstration of the presentation button 305 and switch the device to configuration and demonstration of the presentation mode, thus:

a) Determine time of a frame playback within an audio track for each frame;

b) Make uniform time scaling (shrink/expand) of visual representation for creating and editing graphic figures of visual imagery of each frame until the duration of the frame visual representation and the duration of its sound match;

c) Determine data of frame visualization (aspect ratio, resolution, color, transparency, FPS, etc.);

d) Launch, via a speaker 106 playback, an audio track of the presentation and display on the screen the time-scaled visual representation of creating and editing graphic figures of the frames in their sequence and record the resulting mix of the sound and the animation into a configured audiovisual file of the presentation.

15) Review demonstration of the presentation and evaluate its level of completeness and correspondence to the purposes of the presentation. According to the results of the evaluation:

a) Press the buttons of text, sound or graphic editing and move over to text, sound or graphic correction in this particular work session and to repeated configuration of the presentation;

b) Press "Save work" version of file button and save the configuration file of the presentation in format allowing for future editing of text, sound and visual imagery of the frames in the next work session;

c) Press "Save as" video file button 307 and convert the configuration file of the presentation into a video-file without possibility of future editing of text, sound or images of the frames.

Method of using the device for creating multimedia presentations prototypes in a scenario "Sound/Text/Text_markup_into_frames/Sound_markup_into_frames/Graphics" is implemented as follows:

1) After launching, switch the device to the presentation management mode;

2) Press Create presentation button 303 and switch the device to creation of the presentation mode;

3) Name the presentation in a creation of the presentation mode;

4) Press the sound editing button 206 and switch the device to a sound editing mode of the presentation;

5) In sound editing mode, select a source of the sound, and depending on the source press the following buttons:

a) At importing sound from an external file—import a sound by an external file button, by an external file location button and by a launch/stop audio playback button;

b) At recording a sound from a microphone—record the sound from the microphone button and from a launch/stop audio playback button;

6) Press a text editing button 205 and switch the device to creation of a text part of the presentation mode;

7) In creation of a text part of the presentation mode, press the button corresponding to the way of the presentation text input in the device, as follows:

a) At importing text from external file—an import text button 403;

b) At text input from an on-screen keyboard—show the on-screen keyboard button 405;

c) At verbal text input with an automatic recognition—verbal dictation with the recognition button 404.

8) Enter a text into the device—the entered text is placed in a work field of the device screen;

9) Insert markers of a fragment (frame) text edge 402—in order to press set the marker of frame text edge button 406 and after that press:

a) At importing the text from an external file or entering the text from an on-screen keyboard—on the text displayed in a work field inside the markers of frames text edges;

b) At verbal text entering with automatic words recognition and placing markers of the words edges—on markers of the words edges inside the markers of the frames' text edges.

10) Press sound editing button 206 and switch the device to a sound editing mode of the presentation, thus display on the screen:

a) Text of the sound frames (synchronized) at that particular moment visually presented as segments (bars) corresponding to the frames of the presentation, so visual representation of text, bars or edges of the frames for which the audio track has already been marked up into fragments (frames) 503 is visually different from the presentation of text, bars or edges of bars of the frames for which the audio track has not been marked up yet 504;

b) Mutual visual border of the text content of the presentation 505 corresponds to splitting frames into the frames with marked up and not marked up sound so that the visual location of the border on the screen stays constant as a result of moving (scrolling) of the frame bars in the process of marking up.

11) At audio playback—listen to the sound and when synchronization of one frame ends, the synchronization of another frame begins:

a) At manual markup, press on an image of a text bar of the next frame and insert the displayed marker of an audio track markup, thereby additionally visually animate setup of the markup, e.g., by changing a look of the bar edge;

b) At automatic speech recognition, automatically match recognized words to the texts of the frames and automatically markup the audio track—to check accuracy of the automatic sound markup, and if an error of recognition and markup is detected, press a launch/stop audio playback button and correct the markup;

12) Press graphic editing button 207 and switch the device to the graphic editing of the presentation frames mode, thus image sheet (canvas), tools and palette 605 for creating and editing graphic images of the frame 604 is displayed in a work field starting from the first one;

13) In the graphic editing mode, press buttons corresponding to selected tools of the graphics palette and create and edit graphic figures of the frame by touching the device screen in the area of sheet (canvas), thus record a visual representation of all actions for creating and editing figures.

14) In graphic editing mode the following buttons can be pressed:

a) Turn on/off figures automatic recognition mode 601;

b) Turn on/off text and/or audio narrator 602;

c) Move forward/back through frames 603;

d) Select the look of the transition between the frames.

15) Press demonstration of the presentation button 305 and switch the device to configuration and demonstration of the presentation mode, thus:

a) Determine duration of frame playback within an audio track for each frame;

b) Make uniform time scaling (shrink/expand) of visual representation of creating and editing graphic figures of visual imagery of each frame until the duration of the frame visual representation and the duration of its sound match;

c) Determine data of a frame visualization (aspect ratio, resolution, color, transparency, FPS, etc.);

d) Launch, via a speaker 106, a playback of an audio track of the presentation and launch on the screen the time scaled visual representation of creating and editing graphic figures of the frames in their sequence and record the resulting mix of the sound and the animation into a configuration audiovisual file of the presentation.

16) Review demonstration of the presentation and evaluate its level of completeness and correspondence to the purposes of the presentation. According to the results of the evaluation:

a) Press the buttons of text, sound or graphic editing and move over to text, sound or graphic correction in this particular work session and to repeated configuration of the presentation;

b) Press "Save work" version of file button and save the arrangement file of the presentation in a format allowing for future editing of text, sound and visual imagery of the frames in the next work session;

c) Press "Save as" video file button and convert the configuration file of the presentation into a video-file without possibility of future editing of text, sound or images of the frames.

Those skilled in the art will appreciate that the claimed invention, advantageously, reduces high manpower effort and complexity of creating multimedia presentation for personal and professional use.

Figure 7:
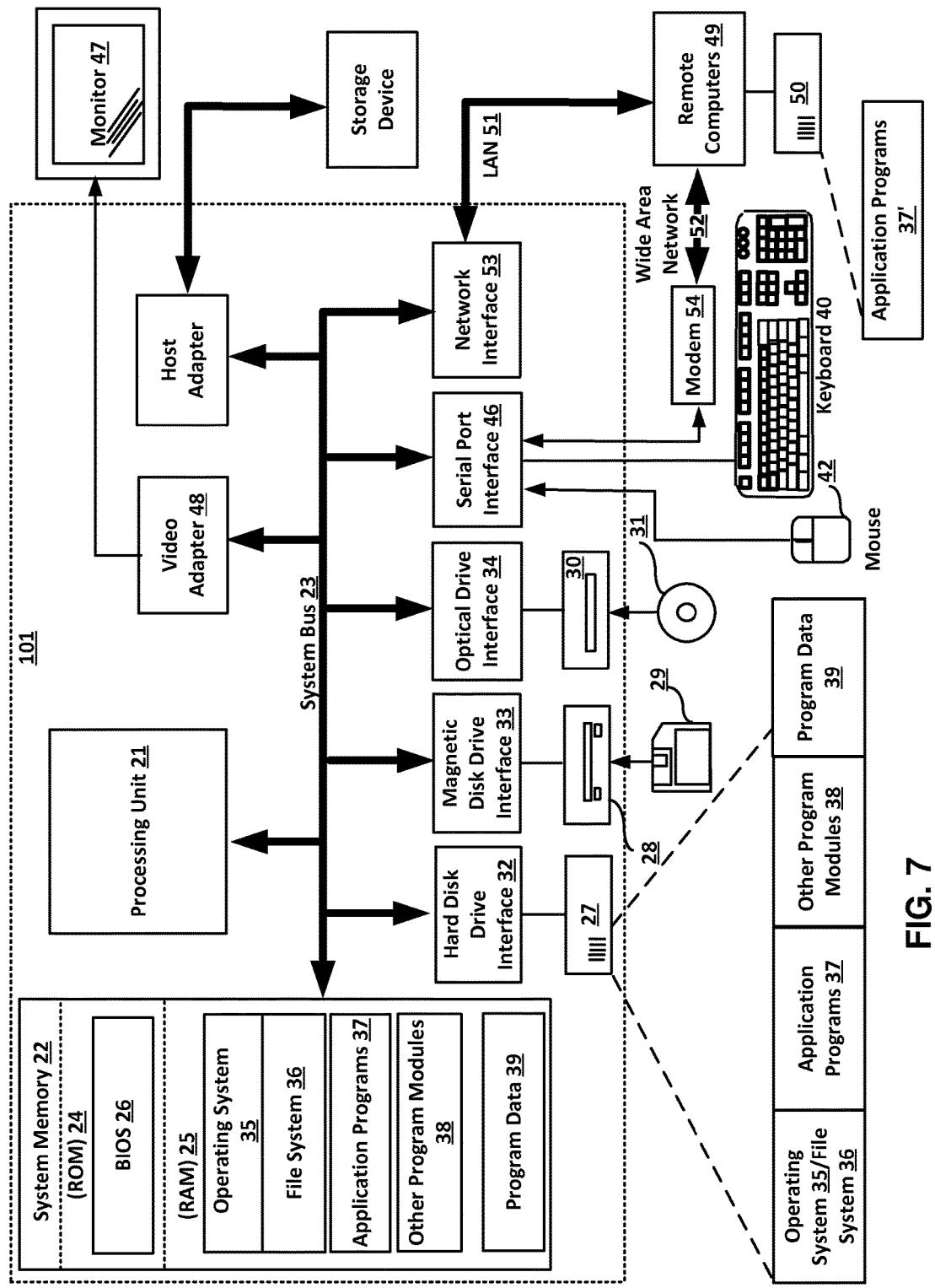
FIG. 7 illustrates an example of a computer or a server on which the invention may be implemented.

With reference to FIG. 7, an exemplary system for implementing the invention includes a general purpose computing device in the form of a computer 101 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 101, such as during start-up, is stored in ROM 24.

The computer 101 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 101. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 101 includes a file system 36 associated with or included within the operating system 35, such as the Windows NT™ File System (NTFS), one or more application programs 37, other program modules 38 and program data 39. A user may enter commands and information into the personal computer 101 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 101 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 101, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 101 is connected to the local network 51 through a network interface or adapter 53. When used in a WAN networking environment, the personal computer 101 typically includes a modem 54 or other means for establishing communications over the wide area network 52, such as the Internet. The modem 54, which may be internal or external, is connected to the system bus 23 via the serial port interface 46. In a networked environment, the program modules depicted relative to the personal computer 101, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method have been achieved.

It should also be appreciated that various modifications, adaptations, and alternative embodiments thereof may be made within the scope and spirit of the present invention. The invention is further defined by the following claims.

What is claimed is:

1. A computer-implemented method for creating an animation, the method comprising:
   using a processor of a touchscreen device, defining animation sequences and an order of transition between the animation sequences;
   preparing a composition of a visual content and an audio track of the animation by performing (a) on the touchscreen device, drawing dynamic elements corresponding to the animation sequences, wherein the dynamic elements are added to a static background image of each animation sequence, by recording a process of the drawing that uses a finger or a stylus on the touchscreen device;
(b) entering a text to be narrated as the audio track into the touchscreen device;
(c) specifying boundaries between fragments of the text by using a stylus or a finger to manually indicate the boundaries, wherein the fragments of the text correspond to neighboring animation sequences, and placing markers of a text markup at locations of the boundaries;
(d) recording the audio track, using a microphone of the touchscreen device, by narrating the text so that pauses in the audio track correspond to the markers and represent transitions between the neighboring animation sequences;
(e) splitting the audio track into portions associated with the animation sequences during the narration;
(f) creating a configuration file for each animation sequence by determining a playback duration of the corresponding animation sequence and by making a uniform time scaling of the visual representation of the animation, so that a duration of the visual representation is adjusted to match a duration of the audio track recorded through the microphone;
(g) setting an aspect ratio, resolution, color, transparency and FPS of the animation;
simultaneously playing back, on the touchscreen device, the audio track and a time scaled visual representation of the dynamic elements as they were being drawn, and recording a resulting mix of the audio track and the dynamic elements into a configuration file of each animation sequence;
playing back the configuration file of the animation sequence on the touchscreen device;
combining the configuration files of the animation sequences in the order of transition of the animation sequences into a configuration multimedia file of the animation; and
saving the configuration multimedia file of the animation.

2. The method of claim 1, further comprising editing the text, the audio track and the dynamic elements and re-configuring the animation film.

3. The method of claim 1, wherein the text is entered into the touchscreen device by any of:
loading prepared text from an external source;
entering the text using an on-screen keyboard; and
inserting the text verbally via a microphone with speech-to-text recognition.

4. The method of claim 1, further comprising marking up the audio track, including the steps of:
displaying the text and audio frames synchronized at a particular moment in time visually presented as segments corresponding to the animation sequences, so that a visual representation of the text, bars or edges of the animation sequences for which the audio track has already been marked up is visually different from a presentation of the text, bars or edges of the animation sequences for which the audio track has not yet been marked up; and
displaying a visual border of the text corresponding to splitting animation sequences into the animation sequences with marked up and not marked up audio content, so that a visual location of the border on a screen stays constant as a result of scrolling of the frame bars in a process of marking up;
inserting a marker of an audio track markup where synchronization of one animation sequence ends and synchronization of another animation sequence begins in case of a manual markup; and
automatically matching recognized words to texts of the animation sequences and automatically marking up the audio track in case of an automatic speech recognition.

5. The method of claim 1, further comprising creation and editing dynamic elements of a animation sequence by:
automatically detecting drawn dynamic elements and correcting their geometry, wherein a duration of drawing of the dynamic elements is equal to a duration of the drawing of the original dynamic elements, excluding an actual time for automatic correction and reviewing suggested versions;
attaching indicating lines and captions to the dynamic elements and automatically move matching lines and text along with the dynamic elements when moving them during editing;
setting a transition mode between the dynamic elements of two adjacent animation sequences;
playing back a fragment of the audio track of a current animation sequence in order to check creation of the dynamic elements of the animation sequence; and
testing an animation of an already created part of the visual imagery of the animation sequence in order to check the creation of the dynamic elements of the animation sequence.

6. The method of claim 1, further comprising creating a configuration file of the animation sequence for synchronization of animation with audio, wherein a time of visual representation of creating and editing dynamic elements of is determined:
from a start marker of the audio track to the end marker of the audio track; and
from a start of an actual sound of a first word of the text of the animation sequence to of a end of a sound of a last word of the text of the animation sequence,
wherein additional pauses are inserted before the start of the sound of the first word of the first animation sequence and after ending of the sounding of the last word of the last animation sequence.

7. The method of claim 1, further comprising correction of the animation sequences by:
manually indicating a boundary of two text fragments for two new neighboring animation sequences, and placing markers of a text markup at a location of the boundary;
determining which one of the two new created animation sequence has the dynamic elements of an original animation sequence;
creating dynamic elements for the second animation sequence;
deleting markers of text markup and audio track of the animation sequences, if there are no dynamic elements found in the animation sequences;
deleting the marker of the text markup and the audio track of the animation sequences and attaching the dynamic elements to the resulting integrated animation sequence, if the dynamic elements are present only in one of the integrated animation sequences; and
if there are no dynamic elements present in both integrated animation sequences:
deleting the markers of the text markup and the audio track of the animation sequences;

creating the resulting audio track by consecutive connection of two original audio tracks keeping their original sequence; and creating resulting dynamic elements by consecutive connection of two original dynamic elements keeping their original sequence and a frame rate of the original animation sequences.

8. The method of claim 1, further comprising correcting markup of the audio track by:

determining two adjacent animation sequences and location of a marker of the audio track markup to be corrected;

displaying an image of the audio track with a sound end marker;

playing back continuous consistent sounds of both animation sequences and simultaneously displaying a time line with a locator of a current position of the marker of the audio track markup;

moving a locator of the marker of audio track markup on time line right or left after listening to an end of one animation sequence and beginning of the following one; and checking result after moving to playback audio of the track from time mark N seconds to a new position of marker of audio track markup, where N is from 0 to 4 seconds.

9. The method of claim 1, further comprising executing a transition between two adjacent animation sequences when creating a new frame by:

saving an image of the previous animation sequence without changes as a start image of a new animation sequence;

erasing the image of the previous animation sequence completely;

erasing the entire image of the previous animation sequence by moving an eraser tool on a screen;

erasing the image of the previous animation sequence up to a background image;

erasing a part of a screen field by the eraser tool horizontally;

erasing chosen elements of the image of the previous animation sequence;

restoring a final image of the animation sequence before the previous one;

rotating a visual field of the previous animation sequence;

opening a clean space for creating dynamic elements of the new animation sequence and leaving in sight a small part of the image of the previous frame;

minimizing into an icon the resulting image of the previous animation sequence and placing the icon on the screen field of the new animation sequence;

minimizing the resulting image of the previous animation sequence and leaving it on the screen field of the new animation sequence; and extending the resulting image of the previous animation sequence and leaving the part visible within the frame edges on the screen field of the new animation sequence.

10. A system for creating an animation, the system comprising:

a touchscreen device having a processor, the processor configured to define animation sequences and an order of transition between the animation sequences;

the processor configured to prepare a composition of a visual content and an audio track of the animation and combining them into an animation file, preparing a composition of a visual content and an audio track of the animation and combining them into an animation file, by performing (a) on the touchscreen device, drawing dynamic elements corresponding to the animation sequences, wherein the dynamic elements are added to a static background image of each animation sequence, and recording a visual representation of a process of the drawing;

(b) preparing a text to be narrated as the audio track and entering the text into the touchscreen device;

(c) specifying boundaries between fragments of the text by using a stylus or a finger to manually indicate the boundaries, wherein the fragments of the text correspond to neighboring animation sequences, and placing markers of a text markup at locations of the boundaries;

(d) recording the audio track, using a microphone of the touchscreen device, by narrating the text so that pauses in the audio track correspond to the markers and represent transitions between the neighboring animation sequences;

(e) splitting the audio track into portions associated with the animation sequences during the narration;

(f) creating a configuration file for each animation sequence by determining a playback duration of the animation sequence and by making a uniform time scaling of the visual representation of the animation, so that a duration of the visual representation is adjusted to match a duration of the audio track recorded through the microphone;

(g) setting an aspect ratio, resolution, color, transparency and FPS of the animation;

simultaneously playing back, on the touchscreen device, the audio track and a time scaled visual representation of the dynamic elements as they were being drawn, and recording a resulting mix of the audio track and the dynamic elements into a configuration file of each animation sequence;

playing back the configuration file of the animation sequence on the touchscreen device;

combining the configuration files of the animation sequences in the order of transition of the animation sequences into a configuration multimedia file of the animation; and saving the configuration multimedia file of the animation.

11. The system of claim 10, wherein the processor is configured to:

automatically detect verbal text pronunciation;

automatically divide the recorded audio track into audio fragments and connect these audio fragments with the matching text sequences; and automatically detect drawn graphic figures and select their smoothed out and regular-shaped equivalents from an image library.

12. The system of claim 10, wherein upon detecting a touch on different areas of the touch screen device, an on-screen mode of an operation selection panel is presented in a form of a bar divided into field-buttons with icons of operation modes, wherein when the field-buttons are pressed on, they expand lengthwise and sub-buttons available in these modes of operations of the touchscreen device appear; and wherein:

a mode of the operations selection panel is located in an upper section of the screen across the entire width and is provided with the fields-buttons "Presentation management", "Text editing", "Sound editing", and "Graphic editing";

a work field of an active operation mode is displayed under the selection panel on the touchscreen device;

at startup of the touchscreen device, if a processed prototype is not selected, the touchscreen device switches to the "Presentation management" mode and the icons available for review or editing of prototypes with captions are displayed in a work field; and if the prototype is selected at launch, the touchscreen device switches to the "Text editing" mode of the selected prototype, thus the text of the prototype is displayed in the work field.

13. The system of claim 10, wherein the field-button "Presentation management" contains sub-buttons "Create presentation", "Open presentation for editing", "Launch demonstration of presentation", "Delete presentation", "Save presentation as" and wherein the icons of the presentation prototypes with captions are displayed in the work field.

14. The system of claim 10, wherein the field-button "Text editing" contains sub-buttons "Text import", "Text verbal dictation with recognition", "Text input from on-screen keyboard", "Insert the marker of the frame text edge."

15. The system of claim 10, wherein the field-button "Sound editing" contains sub-buttons "Import sound from file and markup sound into words", "Record sound from microphone and markup sound into words", wherein the text of the prototype is split into segments corresponding to fragments of the animation and is displayed in the work field, so that a text part of the animation for which an audio track is already marked up into fragments is different from a part for which markup is not done yet.

16. The system of claim 10, wherein the field-button "Graphic editing" contains sub-buttons "Turn on/turn off figures automatic recognition mode", "Turn on/turn off text narrator", "Move forward/back through frames", wherein an image sheet, tools and a palette for creating and editing graphic images of a current frame is displayed in the work field.

17. The system of claim 10, wherein upon pressing on the "Sound editing" button, the icons of graphic images corresponding to the frames are displayed in the segments of a work field along with the text.

18. The system of claim 17, wherein when the segments of the work field are pressed on, a pronounceable or a recognizable text is attached to the frame text displayed in a current segment of the work field.

19. The system of claim 17, wherein a sub-button "Move forward/back through frames" for the frame starting from the second is implemented in a form of two buttons "Scroll forward/back" and "Select the look of transition between frames", wherein when the button "Select the look of transition between frames" is pressed, a list of the selection of the transition mode is displayed as a set of the buttons: "Save frame image as starting image of the next frame", "Erase frame image entirely and instantly", "Erase frame image entirely with delay", "Erase frame image entirely with eraser tool", "Erase frame image up to background", "Erase part of frame image with eraser tool", "Erase selected elements of frame image", "Restore final image of the frame before the previous", "Move (rotate) the image opening blank space to create figures of a new frame and leaving in sight a small part of the previous frame image", "Minimize frame image placing the icon on the field of a new frame", "Shrink frame image and leave it on the field of a new frame", "Expand frame image and leave it on the field of a new frame".

20. A computer program product comprising a computer-readable non-transitory medium containing computer code for creating an animation file by performing the steps of:

(a) defining animation sequences of the animation file on a touchscreen device, each animation sequence including a static background image;

(b) drawing dynamic elements corresponding to the animation sequences, wherein the dynamic elements are added to the static background image of each animation sequence, and recording a process of the drawing that uses a finger or a stylus on the touchscreen device;

(c) entering a text to be narrated into the touchscreen device;

(d) specifying boundaries between fragments of the text by using a stylus or a finger to manually indicate the boundaries, wherein the fragments of the text correspond to neighboring animation sequences, and placing markers of a text markup at locations of the boundaries;

(e) recording an audio track, using a microphone of the touchscreen device, by narrating the text so that pauses in the audio track correspond to the markers and represent transitions between the neighboring animation sequences;

(f) splitting the audio track into portions associated with the corresponding animation sequences;

(g) creating a configuration file for each animation sequence by determining a playback duration of the animation sequence and by making a uniform time scaling of the visual representation of the each animation sequence so that a duration of the visual representation is adjusted to match a duration of the audio track;

(h) setting a transparency and FPS of the animation sequences;

(i) simultaneously playing back, on the touchscreen device, the audio track and a time scaled visual representation of the dynamic elements as they were being drawn, and recording a resulting mix of the audio track and the dynamic elements into a configuration file of each animation sequence;

(j) playing back the configuration files of the animation sequences on the touchscreen device;

(k) combining the configuration files of the animation sequences into a configuration multimedia file; and (l) saving the configuration multimedia file.

* * * * *